United States Patent
Vanderhoff

(10) Patent No.: US 8,867,850 B2
(45) Date of Patent: Oct. 21, 2014

(54) MODELING HUMAN PERCEPTION OF MEDIA CONTENT

(75) Inventor: Earl Wayne Vanderhoff, Cranston, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 318 days.

(21) Appl. No.: 13/301,160

(22) Filed: Nov. 21, 2011

(65) Prior Publication Data

US 2013/0128055 A1     May 23, 2013

(51) Int. Cl.
    *G06K 9/62*     (2006.01)
    *H04N 17/00*     (2006.01)

(52) U.S. Cl.
    CPC .................................. *H04N 17/004* (2013.01)
    USPC ........... 382/224; 382/100; 382/172; 382/180; 348/180

(58) Field of Classification Search
    USPC .................. 382/100, 172, 180, 224; 348/180
    See application file for complete search history.

(56) References Cited

U.S. PATENT DOCUMENTS

| | | | | |
|---|---|---|---|---|
| 2003/0118243 | A1* | 6/2003 | Sezer et al. | 382/245 |
| 2005/0123886 | A1* | 6/2005 | Hua et al. | 434/307 A |
| 2008/0219564 | A1* | 9/2008 | Covell et al. | 382/224 |
| 2011/0090950 | A1* | 4/2011 | Bush et al. | 375/240.02 |
| 2012/0154601 | A1* | 6/2012 | Ferguson | 348/180 |

\* cited by examiner

*Primary Examiner* — Chan Park
*Assistant Examiner* — Eueng-Nan Yeh

(57) ABSTRACT

A system includes a content evaluation device is configured to receive reproduced media content and compare the reproduced media content to reference media content to determine a quality of the reproduced media content relative to the reference media content. The content evaluation device is configured to apply an entropy factor to the determined quality to model human perception of the reproduced media content. A method of determining the entropy factor includes converting the reference media content or the reproduced media content to a grayscale image, counting a number of unique luminance values in the grayscale image, determining the total number of possible luminance values, and defining the entropy factor to be the number of total pixels compared relative to the maximum number of pixels represented by any single luminance value multiplied by the number of possible luminance values.

16 Claims, 6 Drawing Sheets

MODELING HUMAN PERCEPTION OF MEDIA CONTENT

BACKGROUND

Content providers are continually looking for additional ways to provide media content, such as television, movies, streaming video and music, games, etc., in a way that is convenient for customers. Some content providers make media content available to customers on different types of electronic devices such as a set-top box, a personal computer, a tablet computer, or a cell phone. Content providers can also provide media content "on-demand," which allows the customer to select the time the content is consumed.

DETAILED DESCRIPTION

An exemplary system includes a content evaluation device that is configured to receive and compare reproduced and reference media content to determine the quality of the reproduced media content relative to the reference media content. The content evaluation device is further configured to apply an "entropy factor" to the determined quality to model human perception of the reproduced media content. Entropy may be described as a measure of scene "business". One way to calculate the entropy factor in media is to convert the media content to a grayscale image, compute the mathematical area of a theoretical rectangle described by: dimension A the total number of possible luminance values expressed in the resulting grayscale image (256 for 8-bit expressions) and dimension B the maximum number of pixels of any single luminance value expressed in the grayscale image. The entropy factor may be assigned based on the ratio of the number of individual pixels in the image to the mathematical area described by dimension A multiplied by dimension B.

The system may take many different forms and include multiple and/or alternate components and facilities. While an exemplary system is shown in the figures, the example components illustrated in the figures are not intended to be limiting. Indeed, additional or alternative components and/or implementations may be used.

Figure 1:
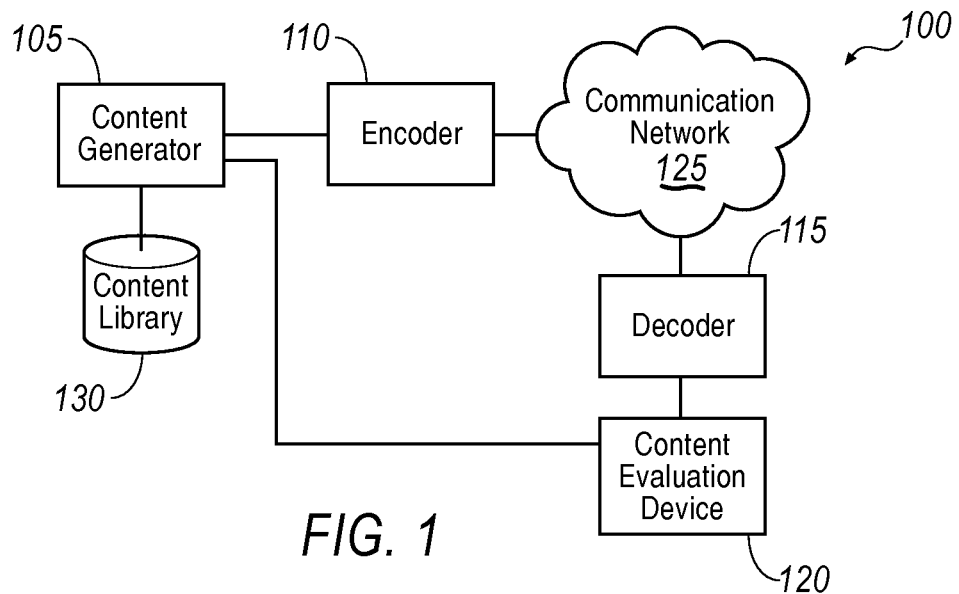
FIG. 1 is a block diagram of an exemplary system for assessing the quality of reproduced media content by modeling human perception of the reproduced media content.

FIG. 1 illustrates an illustrative system 100 that can be used to model human perception of reproduced media content. The system, as shown, includes a content generator 105, an encoder 110, a decoder 115, and a content evaluation device 120. These components are in communication with one another over a communication network 125.

The content generator 105 may include any combination of electronic hardware and software configured to transmit media content over the communication network 125. The media content transmitted by the content generator 105 may include television, movies, streaming video or music, games, etc. The content generator 105 may be configured to select and access media content from a content library 130 that may include a database of various media content instances. The content library 130 may include media content instances of the same type (e.g., television shows) or of different types (e.g., television shows, movies, streaming music, and games).

The content generator 105 may be configured to receive a query for a particular media content instance. In response to the query, the content generator 105 may select the media content instance from the content library 130 and transmit the media content instance to one or more devices over the communication network 125. Some types of devices that may receive the media content instance may include a set-top box, a personal desktop or laptop computer, a tablet computer, a mobile phone, etc.

The encoder 110 may include any hardware, software, or combination of both configured to convert data from one format to another. The encoder 110 may be in communication with the content generator 105 and configured to receive the media content the content generator 105 selects to transmit over the communication network 125. Prior to transmission, the encoder 110 may, in one possible approach, compress the media content so that it may be transmitted over the communication network 125 over a shorter amount of time and using fewer network resources than if the media content were not compressed. The encoder 110 may be a stand-alone device, integrated into the content generator 105, or integrated into another device not shown.

The decoder 115 may include any combination of hardware and software configured to receive the encoded media content from the encoder 110 after, e.g., the encoded media content has been transmitted over the communication network 125. The decoder 115 may be configured to decode the encoded media content to, for instance, restore the encoded media content as close to its original form as possible. The decoder 115 may be a stand-alone device, or integrated into the content evaluation device 120 or another device not shown.

The content evaluation device 120 may include any device in communication with the content generator 105 over the communication network 125 and configured to receive media content from the content generator 105. The content evaluation device 120 may be configured to receive two versions of the same media content—reference media content and reproduced media content. The reproduced media content may include the decoded media content output by the decoder 115. The content evaluation device 120 may be further configured to compare the reproduced media content to the reference media content to determine the quality of the reproduced media content. The quality of the reproduced media content may be based on how closely the reproduced media content matches the reference media content. Such a match cannot necessarily be based solely upon how identical the reproduced media content is to the reference media content, as in some processes, because these are intentionally not the same. An example of such a process is "reframing" a wide aspect image, whereby left and right portions of an image are removed to allow the remaining portions of that image to fit a standard aspect video screen (where, e.g., the height/width ratio the viewing portal is described as 3:4), or alternately stretching a standard aspect image to fully occupy a wide aspect screen (where, e.g., the height/width ratio of the viewing portal is described as 9:16). There are several factors used to determine reproduced or processed quality, chief among them are content placement, color reproduction, and edge transitions. Edge transitions may be described as a noticeable change from any color(s), to another single color, which remains essentially homogenous over a notable area of the image. Another way of understanding edge transitions is to imagine a simple pencil drawing of any scene where no shading has been applied. In such a reproduction only the edges of objects are depicted, and always by only a single line. There are several possible edge transition distortions in reproduced video or images relative to image clarity or fuzziness. Fuzziness may occur when the color transitions have been rendered less immediate or overt than in the original. If a particular reference media displays a completely white object against a completely black background, and the transition from black to white is immediate (all pixels are either completely white or completely black), but the transition is gradual in the reproduction (black to gray then to white), then it can be said that the reproduction displays fuzziness. The effect is that the reproduction appears more "out of focus" than the original.

To model human perception of the degradations in fuzziness, that is the way a hypothetical human being would perceive the integrity of the edge transitions in the reproduction as compared to the original, the content evaluation device 120 may apply an entropy factor, discussed below. In one exemplary approach, the content evaluation device 120 may determine a fuzziness factor of both the reference media content and the reproduced media content. The fuzziness factor may define, among other things, how blurry the media content appears. Determining the fuzziness factor may provide the content evaluation device 120 with some context of the media content being analyzed. A high fuzziness factor may indicate that the media content, taken in context, should appear blurry to a human being. A low fuzziness factor may indicate that the media content should not appear blurry to a human being. Within any single image, this fuzziness factor may or may not relate to image quality. For instance, portions of an image representing distant objects may be intentionally fuzzy due to camera lens focus adjustments so that the viewer perceives sharpness on a object of interest in the foreground. The content evaluation device 120, therefore, may be configured to determine the fuzziness factor of both the reference media content and the reproduced media content to determine if any increase in fuzziness has occurred.

The content evaluation device 120 may be configured to identify luminance differences among adjacent pixels in a portion of the reproduced media content and a commensurate portion of the reference media content to determine the respective fuzziness factors. The content evaluation device 120 may be configured to synchronize the reference media content and reproduced media content, as discussed below, and select a group of corresponding adjacent pixels in the reproduced media content and the reference media content. The adjacent pixels may be horizontally, vertically, or diagonally aligned. The content evaluation device 120 may be configured to identify changes in luminance between each adjacent pixel. A large change in luminance may indicate a large difference, representing low blurriness. A small change in luminance, however, may indicate blurriness. The content evaluation device 120 may be configured to compare the change in luminance to a threshold. For instance, the content evaluation device 120 may be configured to add the individual adjacent pixel differences that exceed the threshold and divide the result by the total number of pixels that exceed the threshold. A relatively high number (e.g., based on the number of pixels evaluated) may indicate a sharp image while a relatively low number may indicate a blurry image.

The content evaluation device 120 may be further configured to calculate a fuzziness ratio, which may be defined as the ratio of the fuzziness factor of the reference media content to the fuzziness factor of the reproduced media content, or vice versa. A fuzziness ratio of 1 may indicate that both the reproduced media content and the reference media content have the same fuzziness factor, meaning that the quality of the reproduced media content was not degraded by, e.g., the encoder 110 or decoder 115. A fuzziness factor other than 1 may indicate that the quality of the reproduced media content was affected by the encoding and decoding process. One illustrative process that may be used by the content evaluation device 120 to calculate the fuzziness ratio is presented below in FIG. 5.

A human being may not be able to identify all effects that the encoding and decoding process may have on the reproduced media content. For instance, a minimal amount of degradation may go unnoticed, especially if the reproduced media content includes a significant amount of entropy in the video image(s). Accordingly, the content evaluation device 120 may be configured to apply the entropy factor to the fuzziness ratio to model such human perception. By doing so, the content evaluation device 120 may interpret the quality of the reproduced media content relative to the reference media content in the context of how the reproduced media content would be viewed by a hypothetical person. This quality based on human perception (e.g., the quality determined after the entropy factor has been applied) may be referred to as perceptual quality.

One example process that the content evaluation device 120 may use to calculate the entropy factor is presented below with respect to FIG. 6. In short, to calculate the entropy factor, the content evaluation device 120 may be configured to convert the reference media content to a grayscale image, compute the mathematical area of a theoretical rectangle described by: dimension A, which may represent the total number of possible luminance values expressed in the resulting grayscale image (256 for 8-bit expressions) and dimension B, which may represent the maximum number of pixels of any single luminance value expressed in the grayscale image. The content evaluation device 120 may, in one example implementation, be configured to assign the entropy factor based on the ratio of the number of individual pixels in the image to the mathematical area described by dimension A multiplied by dimension B.

The content evaluation device 120 may be configured to compare the perceptual quality to a predetermined threshold. The predetermined threshold may define a minimum standard of quality for the reproduced media content. That is, if the perceptual quality of the reproduced media content falls below the predetermined threshold, the quality is deemed unacceptable. As such, if the perceptual quality as determined by the content evaluation device 120 is below the predetermined threshold, the content evaluation device 120 may be configured to take a remedial action, which may include outputting a low-quality indicator to a technician who can investigate the degradation of the reproduced media content relative to the reference media content. Based on the low-quality indicator, the technician may be able to identify a problem with the communication network 125, the encoder 110, the decoder 115, or another component (not shown) in the system 100.

The content evaluation device 120 may be configured to iteratively determine the perceptual quality of the reproduced media content as necessary based on the type of media content. For instance, if the reproduced media content includes video content, the content evaluation device 120 may be configured to determine the perceptual quality at each scene change. If the reproduced media content includes a series of identical pictures, the content evaluation device 120 may be configured to determine the perceptual quality only when the reproduced media content is first received or at predetermined intervals during the transmission of the reproduced media content.

In general, computing systems and/or devices, such as the content generator 105, the encoder 110, the decoder 115, and the content evaluation device 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
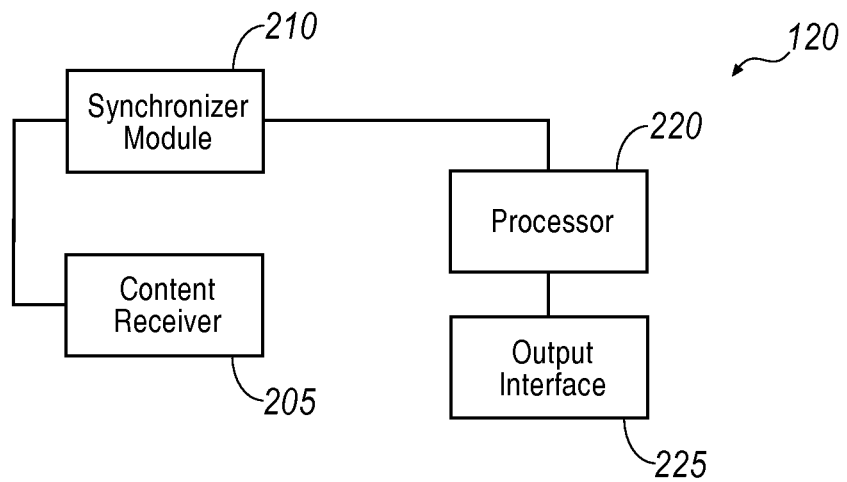
FIG. 2 is a block diagram of an exemplary content evaluation device.

FIG. 2 illustrates a block diagram of illustrative components that may be incorporated into the content evaluation device 120. The content evaluation device 120 may include other components than those shown, and one or more of the illustrated components may alternatively be implemented as a stand-alone device. The content evaluation device 120, as shown, includes a content receiver 205, a synchronizer module 210, a processor 220, and an output interface 225.

The content receiver 205 may include any device configured to receive media content over the communication network 125. The content receiver 205 may include any type of network interface device, and may be configured to receive the reproduced media content from, e.g., the decoder 115 and the reference media content from, e.g., the content generator 105.

The synchronizer module 210 may include any electronic hardware, software, or combination of both that is configured to receive the reproduced media content and the reference media content from the content receiver 205. The synchronizer module 210 may be configured to synchronize the reproduced media content and the reference media content so that both can be evaluated as close to simultaneously as possible. The synchronizer module 210 may be configured to delay the reproduced media content or the reference media content as appropriate. Synchronizing the media content received allows the content evaluation device 120 to evaluate corresponding portions of reproduced media content and the reference media content.

The processor 220 may be in communication with the synchronizer module 210. The processor 220 may be configured to receive synchronized media content instances from the synchronizer module 210. The processor 220 may be configured to determine the fuzziness factor of the reproduced media content, the fuzziness factor of the reference media content, and the entropy factor. With this information, the processor 220 may be configured to determine the relative perceptual quality of the reproduced media content, which as discussed above, represents human perception of the fuzzy degradation in the reproduced media content. That is, the processor 220 may be configured to calculate the fuzziness ratio, as discussed above, and apply the entropy factor to the fuzziness ratio to determine the perceptual quality of the reproduced media content. One possible process that may be implemented by the processor 220 to calculate the fuzziness ratio is discussed in greater detail below with respect to FIG. 5, and one possible process that may be implemented by the processor 220 to calculate the entropy factor is discussed below with respect to FIG. 6.

Moreover, the processor 220 may be configured to compare the relative perceptual degradation in fuzziness to the predetermined threshold, as discussed above. If the perceptual quality falls below the predetermined threshold, the processor 220 may be configure to output low-quality indicator, such as a signal indicating that remedial measures should be taken to determine the cause of the quality degradation of the reproduced media content.

The output interface 225 may be in communication with the processor 220 and configured to receive the low-quality indicator. The output interface 225 may cause a message to be displayed on or transmitted to a display device, such as a television or computer monitor, so that a technician can investigate the cause of the low-quality indicator. The output interface 225 may be, in one possible approach, configured to communicate over the communication network 125 to transmit electronic messages. This way, the technician may receive an email after the processor 220 determines that the perceptual quality of the reproduced media content is below the predetermined threshold.

Figure 3A:
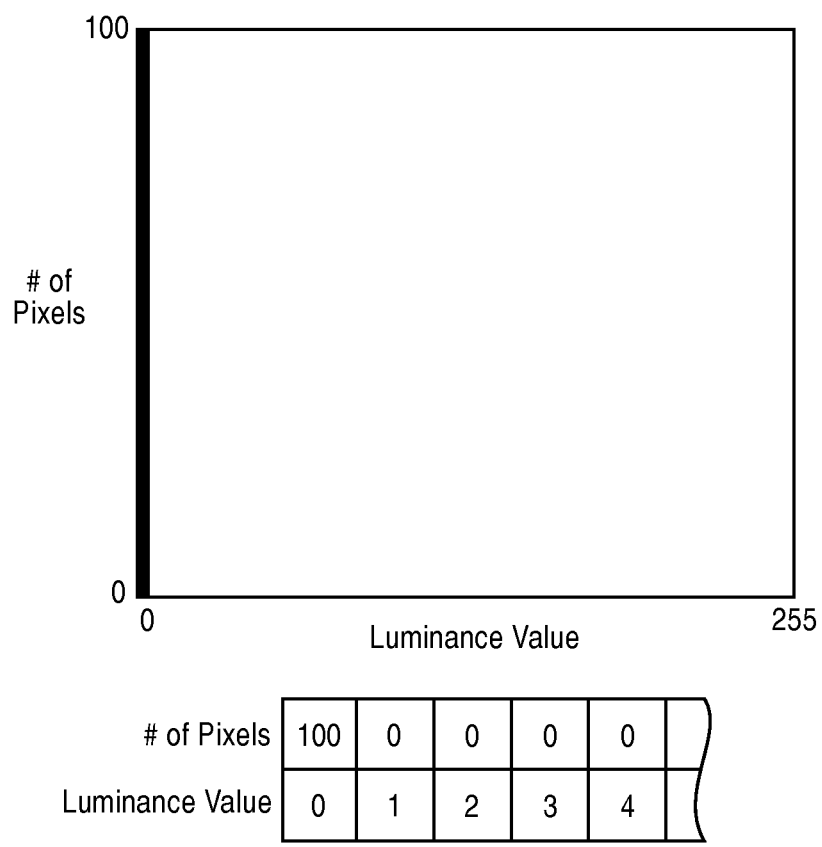
FIGS. 3A-3C illustrate illustrative histograms and corresponding luminance arrays that may be generated by the content evaluation device.
Figure 3B:
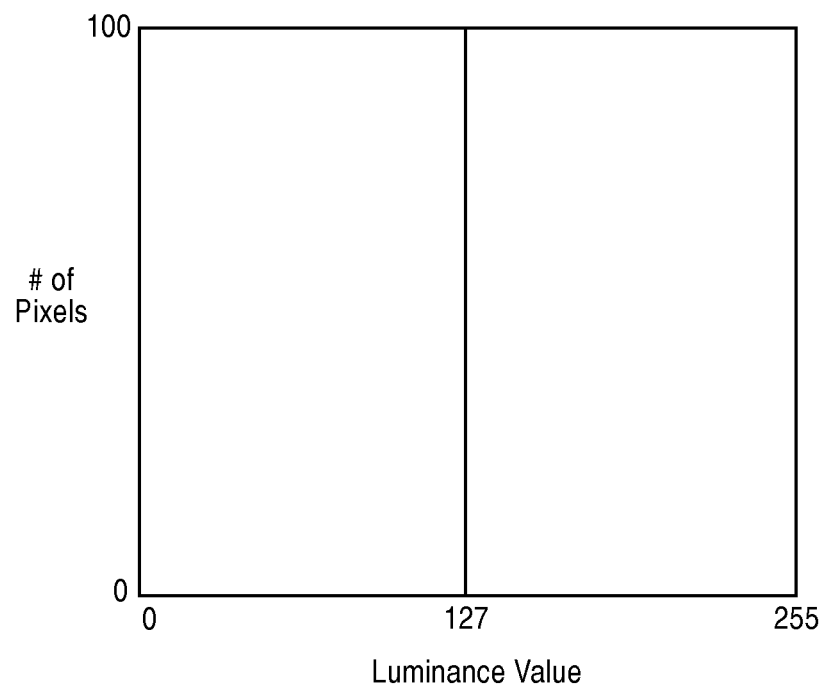
Figure 3C:
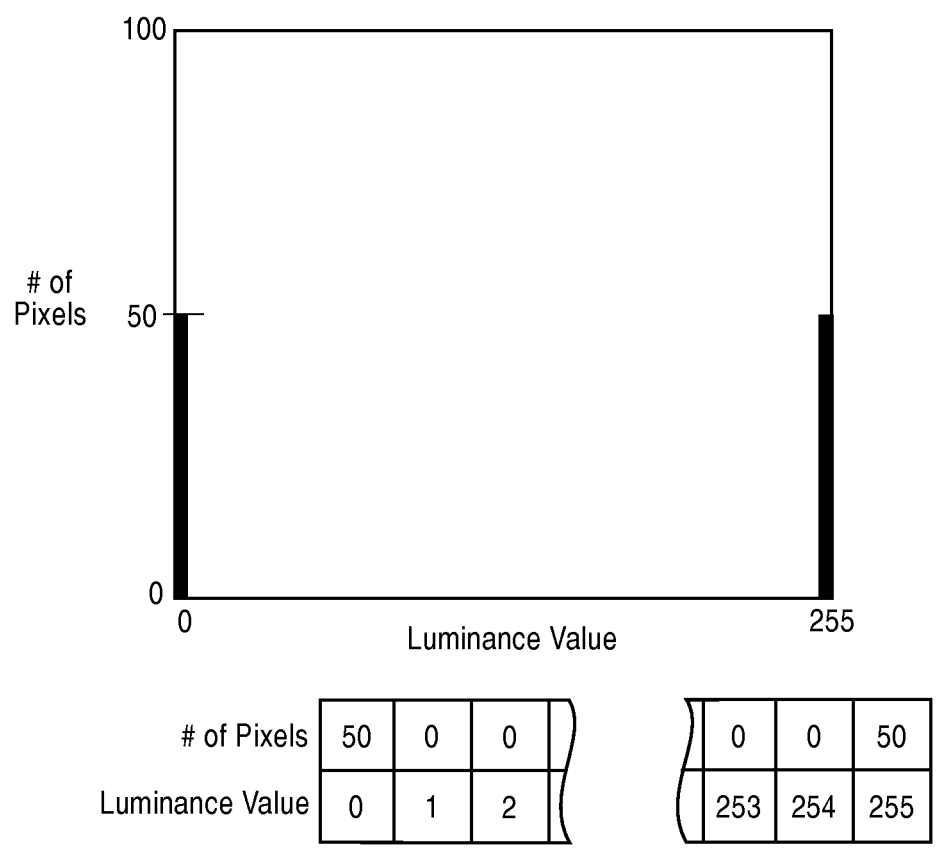

FIGS. 3A-3C illustrate illustrative histograms and corresponding luminance arrays that may be used by the content evaluation device 120, and in particular the processor 220, to calculate the entropy factor. The histograms chart the number of occurrences of each luminance value. For example, in the examples of FIGS. 3A-3C, assume that there are 100 pixels being evaluated, and each pixel can have a luminance value represented by the numbers 0-255.

FIG. 3A illustrates a histogram and corresponding luminance array where all 100 evaluated pixels have the same luminance value, "0." This may occur if all pixels are one color (e.g., black). The corresponding luminance array also indicates that 100 pixels have a luminance value of "0." The content evaluation device 120 may, in this instance, define the entropy factor to be "$1/256$." As discussed above, entropy may be defined as a ratio of the number of pixels to the mathematical area defined by the maximum number of pixels occupying a single luminance value multiplied by the total possible luminance values. In this example, the numerator of the entropy factor is 100, and the maximum number of pixels represented in any luminance value is also 100, There are 256 possible luminance values, represented by the numbers 0-255, so the denominator of the entropy factor is 100 multiplied by 256, or 25,600. The resulting entropy is 100/25,600 or $1/256$.

FIG. 3B illustrates a similar histogram and corresponding luminance array as that presented above in FIG. 3A. In FIG. 3B, however, all 100 pixels represent the same shade of gray (e.g., luminance value 127). As in FIG. 3A, the entropy factor in FIG. 3B is also $1/256$.

FIG. 3C is an illustrative histogram representing reproduced media content where an image that has 50 black pixels (e.g., a luminance value of "0") and 50 white pixels (e.g., a luminance value of "255"). In this example, the content evaluation device 120 may calculate the entropy factor as 100/(50×256), or $1/128$. The total number of pixels remains 100, and the total possible luminance values remains 256. The maximum number of pixels represented by any single luminance value, however, is now 50.

FIGS. 3A-3C illustrate histograms and luminance arrays where the entropy factor is relatively low, either $1/256$ or $1/128$. These entropy factors indicate that the media content instance being evaluated is not very busy. As mentioned above, an entropy of "$1/256$" indicates that all pixels are one color. Higher entropy values, therefore, may indicate a higher degree of busyness, that is, an indication that the media content includes many different colors or some other quality that may cause the media content to appear less blurry to a viewer. Although not illustrated, if each of the 100 pixels presented a unique luminance value, the maximum number of pixels represented by any single luminance value would be 1, and the content evaluation device 120 may calculate the entropy factor to be 100/(1×256). An entropy factor of "$100/256$" indicates a higher degree of busyness than an entropy factor of "$1/256$."

The entropy factor described above has a maximum value of one, which may suggest a very high degree of busyness. In the examples described above, to derive an entropy factor of one each possible luminance value must have an identical number of pixels represented from within the image.

Figure 4:
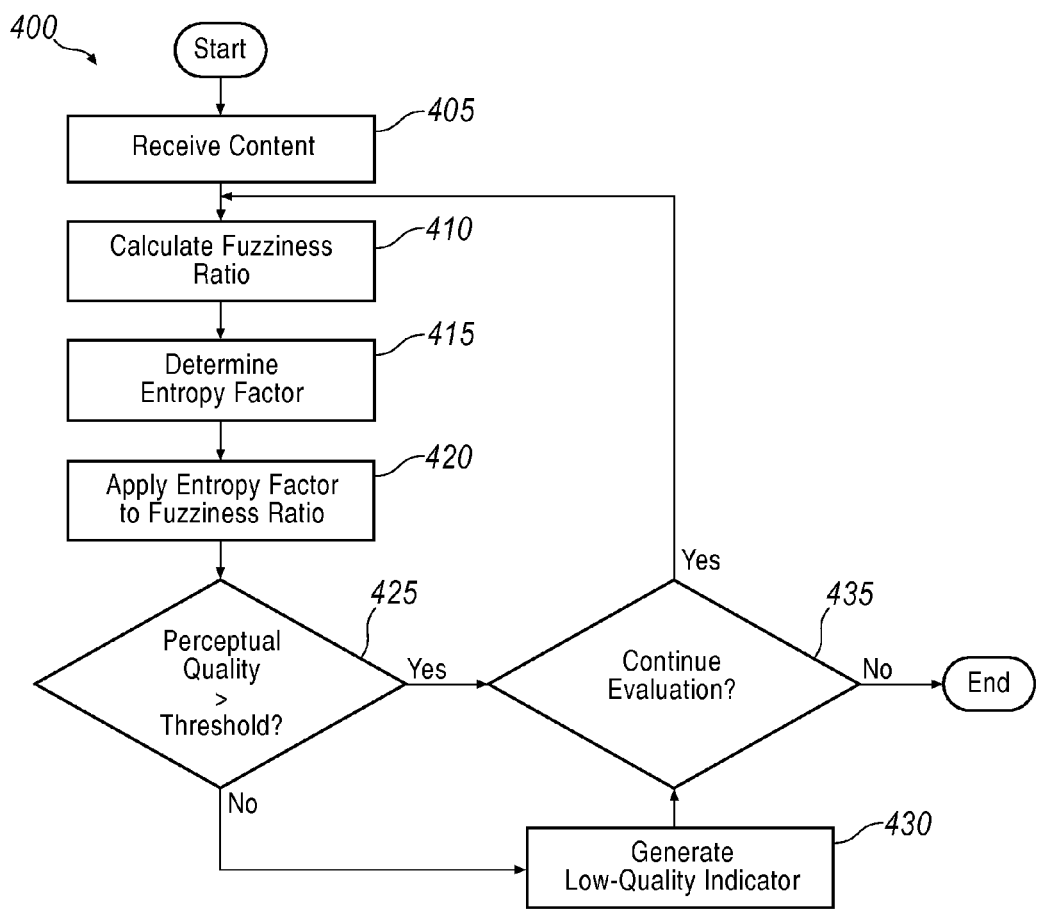
FIG. 4 illustrates a flow diagram of an illustrative process of assessing the quality of the reproduced media content.

FIG. 4 is a flowchart of an illustrative process 400 that may be implemented by the content evaluation device 120 to model human perception of the quality of the reproduced media content.

At block 405, the content evaluation device 120 may receive the reproduced media content and the reference media content. The content evaluation device 120 may receive both either directly or indirectly from the content generator 105. For instance, the content evaluation device 120 may receive the reproduced media content from the decoder 115 and the reference media content directly from the content generator 105. Upon receipt, the content evaluation device 120 may synchronize the received media content. That is, the content evaluation device 120 may, using the synchronizer module 210, delay either the reproduced media content or the reference media content so that both are transmitted to the processor 220 with any temporal latencies removed. This may ensure that the same content is presented to the evaluation device.

At block 410, the content evaluation device 120 may calculate the fuzziness ratio of the reproduced media content relative to the reference media content. For instance, the content evaluation device 120 may determine the respective fuzziness of both of the reproduced media content and the reference media content, and the fuzziness ratio may be defined as the ratio of the fuzziness of the reproduced media content to the fuzziness of the reference media content, and vice versa. One way to calculate the fuzziness ratio is discussed below with respect to FIG. 5.

At block 415, the content evaluation device 120 may determine the entropy factor. The entropy factor may provide context to a media content instance, that is, the way the media content instance would be perceived to a hypothetical human being. For instance, if the media content instance includes complex imagery, with many small individual objects depicted, and/or many smooth gradients or progressive coloring/shading, then the viewer may be expected to not easily or quickly perceive fuzziness. It's important to note that in moving video, perception of fuzziness is a composite detection, generated while viewing video typically delivered at 30 images per second or faster. This renders the ability to quickly detect fuzziness paramount in a viewer's estimation of video quality. The entropy factor may account for this so that the quality determined by the content evaluation device 120 may reflect human perception. One way to determine the entropy factor is discussed below with respect to FIG. 6.

At block 420, the content evaluation device 120 may apply the entropy factor to the fuzziness ratio to determine the perceptual quality of the reproduced media content relative to the reference media content. The perceptual quality, as discussed above, may represent the way the reproduced media content would look to a hypothetical human being viewing the reproduced media content in a particular context.

At decision block 425, the content evaluation device 120 may compare the perceptual quality to a predetermined threshold. In one possible implementation, a perceptual quality that exceeds the threshold may indicate that the perceptual quality is sufficient while a perceptual quality that falls below the threshold indicates low quality (e.g., the reproduced media content was significantly degraded during transmission from the content generator 105). If the content evaluation device 120 determines that the perceptual quality has fallen below the threshold, the process 400 may continue with block 430. If the content evaluation device 120 determines that the perceptual quality exceeds the threshold, the process 400 may continue with block 435.

At block 430, the content evaluation device 120 may generate a low-quality indicator. As discussed above, the low-quality indicator may be output as a message on a display or sent electronically to a technician. This way, the technician may take whatever remedial measures are necessary to identify and fix the cause of the low-quality indicator.

At decision block 435, the content evaluation device 120 may determine whether additional portions of the reproduced media content should be evaluated for perceptual quality. For instance, if the reproduced media content includes video, the content evaluation device 120 may determine that, at each scene change, the evaluation should repeat. Accordingly, the process 400 may return to block 410 and continue from there. If the end of the video has been reached or if there are no additional scene changes in the reproduced media content, the content evaluation device 120 may determine that no further evaluation is needed, and the process 400 may end.

Figure 5:
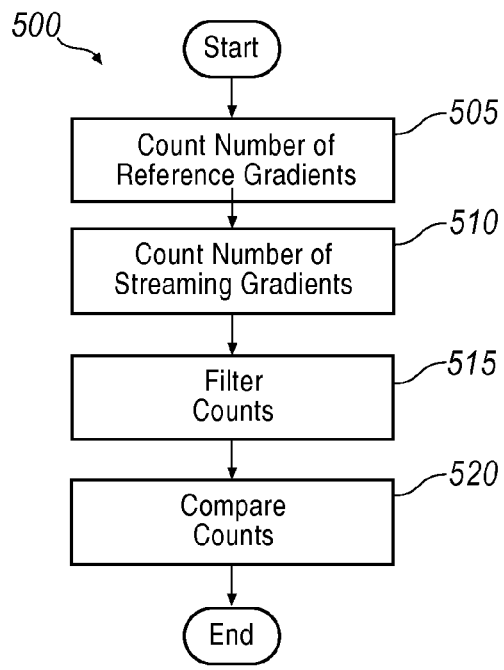
FIG. 5 illustrates a flow diagram of an illustrative process of calculating a fuzziness ratio between the reproduced media content and a reference media content.

FIG. 5 illustrates a flowchart of an illustrative process 500 that may be implemented by the content evaluation device 120 to determine the fuzziness ratio. For instance, the process 500 may be performed by the processor 220.

At block 505, the processor 220 may count the number of gradients in the portion of the reference media content being evaluated. These gradients may be referred to as "reference gradients." As discussed above, each gradient may represent a change in luminance between two adjacent pixels. The adjacent pixels may be horizontally, vertically, or diagonally adjacent. The count of the reference gradients may represent the fuzziness factor of the reference media content, discussed above.

At block 510, the processor 220 may count the number of gradients in the evaluated portion of the reproduced media content. These gradients may be referred to as "reproduced gradients." The reproduced gradients may represent the fuzziness factor of the reproduced media content, as previously discussed.

At block 515, the processor 220 may filter some of the reference gradients, reproduced gradients, or both. For example, some very small changes in the luminance between adjacent pixels may be imperceptible to the human eye even though the processor 220 may be capable of detecting such changes. Therefore, the processor 220 may remove these gradients from the counts taken at blocks 505 and 510.

At block 520, the processor 220 may compare the number of reference gradients to the number of reproduced gradients to calculate the fuzziness ratio. One way the processor 220 may compare these two counts is to take a ratio of the number of reference gradients to reproduced gradients, or vice versa. Because the reference gradients represent the fuzziness factor of the reference media content and the reproduced gradients represent the fuzziness factor of the reproduced media content, taking a ratio of these gradients may in some instances be equivalent to calculating the fuzziness ratio.

Figure 6:
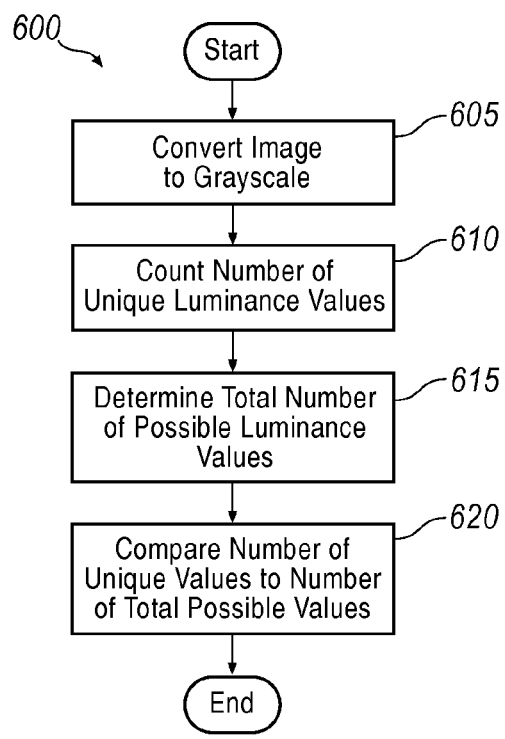
FIG. 6 illustrates a flow diagram of an illustrative process of determining an entropy factor used to model human perception of the reproduced media content.

FIG. 6 is a flowchart of an illustrative process 600 that may be implemented by, for instance, the process of the content evaluation device 120 to determine the entropy factor.

At block 605, the processor 220 may convert the reproduced media content and the reference media content to respective grayscale images. The entropy factor may be the same for both the reproduced media content and the reference media content portions being evaluated. Therefore, in one possible approach, the processor 220 need only convert one of the reproduced media content and the reference media content to the grayscale image. Each shade of grayscale, from black to white, may be represented in the grayscale images as luminance values of 0 (black) to 255 (white).

At block 610, the processor 220 may count the number of unique luminance values represented by the grayscale image. As discussed above with respect to FIGS. 3A-3C, the grayscale image may include 100 pixels, each representing different luminance values. In that case, the count at block 610 may be "100." If, however, each of the 100 pixels represents the same luminance value, the count at block 610 may be "1."

At block 615, the processor 220 may determine the total number of luminance values. In the examples presented above, the shades in the grayscale image are represented by luminance values of 0 through 255, resulting in 256 possible luminance values. The processor 220 may, however, recognize any number of shades, and thus, any number of luminance values.

At block 620, the processor 220 may compare the count determined at block 610 to the number determined at block 615 to determine the entropy factor. That is, in one possible approach, the entropy factor may be a ratio of the number of unique luminance values represented to the total number of possible luminance values. As such, the processor 220 may be configured to express the luminance value as a fraction where the numerator is the count from block 610 and the denominator is the number from block 615.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
a content evaluation device configured to receive reproduced media content and reference media content to determine a quality comparison of the reproduced media content relative to the reference media content, wherein the content evaluation device is configured to apply an entropy factor to the determined quality comparison to model human perception of the reproduced media content,
wherein the content evaluation device is configured to determine a fuzziness factor of the reference media content and of the reproduced media content to determine the quality of the reproduced media content and
wherein the content evaluation device is configured to calculate a fuzziness ratio of the fuzziness factor of the reference media content to the fuzziness factor of the reproduced media content, wherein calculating the fuzziness ratio includes counting a number of reference gradients between pixels of at least a portion of the reference media content and counting a number of reproduced gradients between pixels of at least a portion of the reproduced media content that corresponds to the portion of the reference media content.

2. A system as set forth in claim 1, wherein the content evaluation device is configured to apply the entropy factor to the fuzziness ratio.

3. A system as set forth in claim 1, wherein the content evaluation device is configured to synchronize the reference media content with the reproduced media content.

4. A system as set forth in claim 1, wherein the content evaluation device is configured to compare the determined quality comparison to a predetermined threshold and output a low-quality indicator if the determined quality comparison is below the predetermined threshold.

5. A system as set forth in claim 1, wherein the content evaluation device is configured to iteratively determine the quality comparison of the reproduced media content.

6. A system as set forth in claim 5, wherein the reproduced media content includes video and wherein the content evaluation device is configured to determine the quality comparison at each scene change.

7. A system as set forth in claim 1, wherein the content evaluation device receives two media inputs, the referenced media content and the reproduced media content.

8. A content evaluation device comprising:
a media content receiver configured to receive reproduced media content and reference media content; and
a processor configured to determine a quality comparison of the reproduced media content relative to the reference media content, wherein the processor is configured to apply an entropy factor to the determined quality comparison to model human perception of the reproduced media content,
wherein the processor is configured to determine a fuzziness factor of the reference media content and of the reproduced media content and
wherein the processor is configured to calculate a fuzziness ratio defined as a ratio of the fuzziness factor of the reference media content to the fuzziness factor of the reproduced media content, wherein calculating the fuzziness ratio includes counting a number of reference gradients between pixels of at least a portion of the reference media content and counting a number of reproduced gradients between pixels of at least a portion of the reproduced media content that corresponds to the portion of the reference media content.

9. A content evaluation device as set forth in claim 8, further comprising a synchronizer module including electronic hardware in communication with the media content receiver and configured to synchronize the reproduced media content and the reference media content.

10. A content evaluation device as set forth in claim 9, wherein the content evaluation device is configured to apply the entropy factor to the fuzziness ratio.

11. A content evaluation device as set forth in claim 10, wherein the processor is configured to compare the determined quality comparison to a predetermined threshold and generate a low-quality indicator if the determined quality comparison is below the predetermined threshold.

12. A method comprising:
receiving reproduced media content at a content evaluation device;
receiving reference media content at the content evaluation device;
calculating, via the content evaluation device, a fuzziness ratio of the reproduced media content relative to the reference media content, wherein calculating the fuzziness ratio includes counting a number of reference gradients between pixels of at least a portion of the reference media content and counting a number of reproduced gradients between pixels of at least a portion of the reproduced media content that corresponds to the portion of the reference media content;
determining an entropy factor of at least one of the reproduced media content and the reference media content;
applying the entropy factor to the fuzziness ratio to determine a quality of the reproduced media content relative to the reference media content that models human perception of the reproduced media content.

13. A method as set forth in claim 12, further comprising outputting a quality indicator to a display based on the quality relative to a predetermined threshold.

14. A method as set forth in claim 13, wherein the number of reference and reproduced gradients each represents a change in luminance between adjacent pixels.

15. A method as set forth in claim 14, wherein calculating the fuzziness ratio includes determining a ratio of the number of reference gradients to the number of reproduced gradients.

16. A method as set forth in claim 15, wherein determining the entropy factor includes:
converting at least one of the reference media content and the reproduced media content to a grayscale image;
counting a number of unique luminance values in the grayscale image;
determining the total number of possible luminance values; and
defining the entropy factor to be the number of total pixels compared relative to the maximum number of pixels represented by any single luminance value multiplied by the number of possible luminance values.

* * * * *